(12) United States Patent
Kang et al.

(10) Patent No.: US 7,583,555 B2
(45) Date of Patent: Sep. 1, 2009

(54) ROBUST AND EFFICIENT DYNAMIC VOLTAGE SCALING FOR PORTABLE DEVICES

(75) Inventors: Inyup Kang, San Diego, CA (US); Karthikeyan Ethirajan, San Diego, CA (US); Matthew Levi Severson, Oceanside, CA (US); Mohamed Elgebaly, San Diego, CA (US); Manoj Sachdev, Waterloo (CA); Amr Fahim, Newport Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 10/814,935

(22) Filed: Mar. 30, 2004

(65) Prior Publication Data
US 2005/0218871 A1  Oct. 6, 2005

Related U.S. Application Data

(60) Provisional application No. 60/462,667, filed on Apr. 11, 2003.

(51) Int. Cl.
 G11C 7/00 (2006.01)
 G05F 1/40 (2006.01)
(52) U.S. Cl. .................. 365/226; 323/282
(58) Field of Classification Search ............ 323/268, 323/270, 271, 273, 282, 283; 365/189.02, 365/189.07, 226–228; 713/300, 320, 324
See application file for complete search history.

(56) References Cited

U.S. PATENT DOCUMENTS

| | | | | |
|---|---|---|---|---|
| 6,134,152 A * | 10/2000 | Mullarkey | ............. | 365/189.01 |
| 6,813,210 B2 * | 11/2004 | Okamoto et al. | ............. | 365/222 |
| 6,992,405 B2 * | 1/2006 | Zhang et al. | ................. | 307/140 |
| 7,075,276 B2 * | 7/2006 | Morales | ..................... | 323/246 |
| 7,294,976 B1 * | 11/2007 | Andric et al. | ............... | 315/291 |

* cited by examiner

Primary Examiner—Matthew V Nguyen
(74) Attorney, Agent, or Firm—Jiayu Xu

(57) ABSTRACT

A method and apparatus for voltage regulation uses, in one aspect, worst-case supply voltages specific to the process split of the integrated device at issue. In another aspect, a two-phase voltage regulation system and method identifies the characterization data pertinent to a family of integrated circuit devices in a first phase, and identifies an associated process split of a candidate integrated circuit device in a second phase. The characterization data from the first phase is then used to provide supply voltages that correspond to target frequencies of operation for the candidate device. In another aspect, a hybrid voltage regulator circuit includes an open loop circuit which automatically identifies the process split of the integrated circuit device and allows a regulator to modify supply voltage based on characterization data specific to that process split, and a closed loop circuit which fine-tunes the supply voltage. In one embodiment, the closed-loop circuit includes a critical path replica for providing estimated frequencies of operation necessary for a critical path in the integrated circuit device. A ring oscillator circuit may be used in one embodiment in the critical path and/or in the open loop circuit.

13 Claims, 6 Drawing Sheets

| INDEX | PROCESS |
|---|---|
| 0 | $V_{START}$ |
| $f_1$ | $PROCESS_1$ |
| $f_2$ | $PROCESS_2$ |

| f | SLOW | TYPICAL | FAST |
|---|---|---|---|
| $f_1$ | $V_{S1}$ | $V_{T1}$ | $V_{F1}$ |
| $f_2$ | $V_{S2}$ | $V_{T2}$ | $V_{F2}$ |

FIG. 5
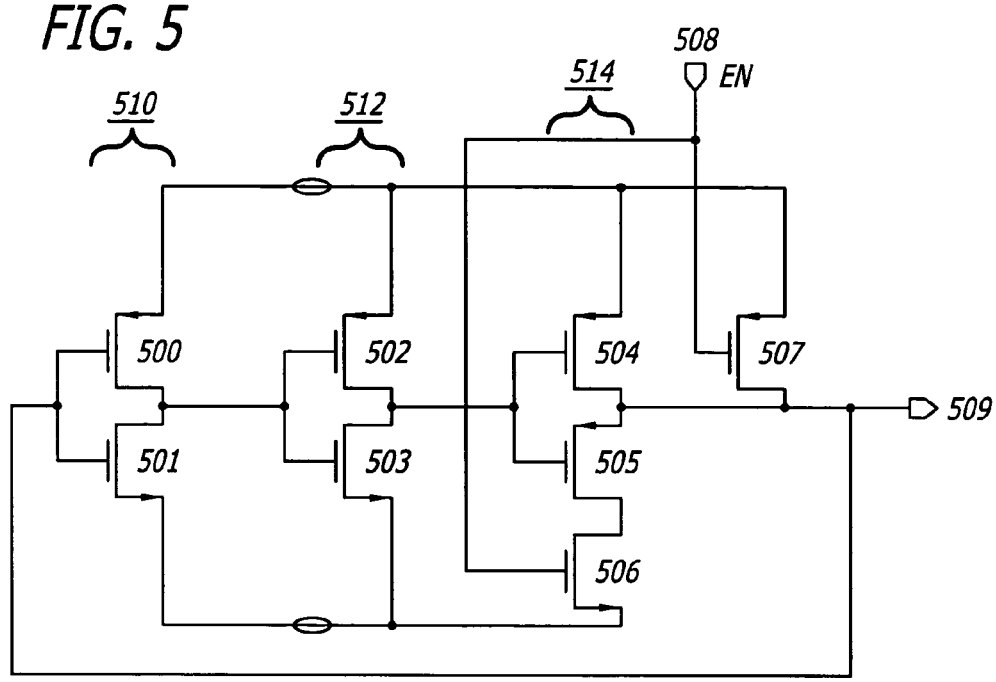
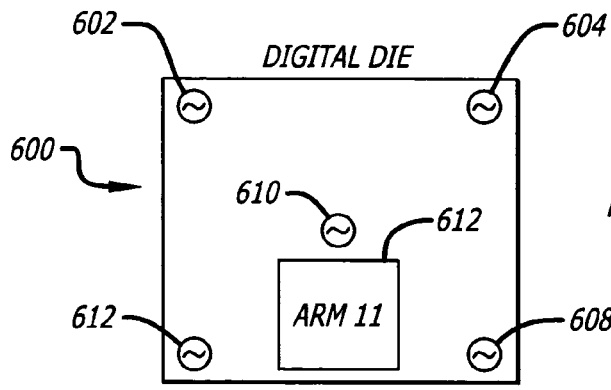
FIG. 6
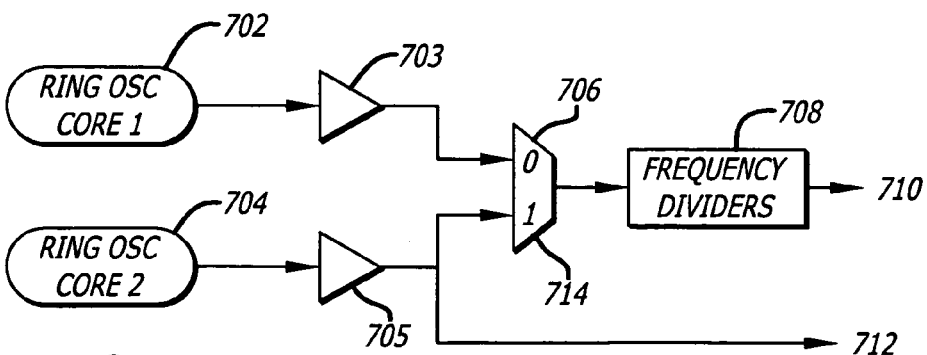
FIG. 7

| SPLIT (AT ROOM TEMP) | VOLTAGE | RO FREQUENCY (MEASURED) | ADSP FREQUENCY (MEASURED) |
|---|---|---|---|
| FAST | 1 | 33 | 63 |
| | 1.2 | 50 | 84 |
| | 1.4 | 60 | 91 |
| | 1.6 | 72 | 99 |
| NOMINAL | 1 | 26 | 27 |
| | 1.2 | 39 | 50 |
| | 1.4 | 48 | 62 |
| | 1.6 | 59 | 75 |

FIG. 10A

| VOLTAGE | RO FREQUENCY (MEASURED) | ADSP FREQUENCY (MEASURED) |
|---|---|---|
| 1 | 30 | 27 |
| 1.2 | 45 | 50 |
| 1.4 | 54 | 62 |
| 1.6 | 66 | 75 |

FIG. 10B

ROBUST AND EFFICIENT DYNAMIC VOLTAGE SCALING FOR PORTABLE DEVICES

CONTINUING DATA

This application claims benefits of 60/462,667 filed on Apr. 11, 2003.

BACKGROUND

1. Field

The present invention relates to integrated circuit technology, and more specifically to voltage source regulation.

2. Background

Portable electronic devices are becoming a mainstream in an increasing body of applications. Devices such as personal digital assistants (PDAs), mobile telephones, and portable computers are commonly used in the marketplace. The ever-growing demand from users of such devices for more applications and greater functionality from the services has pushed the envelope of design trends toward greater integration and more sophisticated processing on a single chip. In addition, as the demand for greater functionality in portable devices has increased, so to has the push for continued decreases in device form factor. These two demands have spurred the development of "system on a chip" designs that typically contain many processing functions on a single silicon chip.

The more functionally sophisticated the portable device becomes, the more energy the device will invariably consume and hence, the smaller the battery life. Long battery life, however, is a very important design and marketing parameter that the portable electronics industries continually strives to improve. Naturally, the desire for increased functionality and decreased size must be measured within the context of the practical limitations associated with existing battery technologies.

Designing more versatile portable devices is nevertheless becoming more feasible as the silicon-based technology scales down. For example, transistor-based technology is becoming progressively smaller. Smaller form factors for silicon devices permit increased circuit functionality within the same area as devices using larger form factors. With smaller feature size, more integration and greater amounts of circuitry with added functionality can be built within a given area on a silicon die. Further, smaller integrated circuits require and consume less energy.

Silicon based technologies have, as a practical matter, geometrical limits. Accordingly, more sophisticated integrated circuits require for optimal performance the design of energy reduction techniques, including integrated circuits used in a variety of portable devices. These techniques can be essential to the design of such devices. Currently, the most effective energy reduction method is to perform supply voltage regulation and to scale down the supply voltage to the chip where possible. Voltage regulation is a product of the industry's recognition that consumed energy has a quadratic dependence on voltage, and hence directly relates to the amount of power consumed by the battery or power source. In an illustration using complimentary metal-oxide-semiconductor (CMOS) technology, the active dynamic energy dissipation for CMOS transistors is given by the relationship $$E = C_{avg} V_{DD}^2$$

where $V_{DD}$ is the supply voltage, $C_{avg}$ represents the average switching capacitance, and E represents the dissipated energy resulting from a change of state of the transistor. From this relationship, it can be seen that reducing the supply voltage will correspondingly reduce the dissipated energy in the circuit.

Regardless of the silicon technology at issue, peak supply voltage is generally selected based on peak performance requirements of the integrated circuit. Frequently, peak performance may not be required by the processing unit(s) on the integrated circuit. Accordingly, supply voltage as a general matter can be scaled down when peak performance is not required. A classic example involves a cellular telephone in standby mode. Another illustration includes a portable data-receiving device whose processing circuitry recognizes that it can receive a given data stream at a much smaller data rate than the circuitry is capable of handling. In this instance, the device may not require a peak supply voltage to receive the data stream, and may activate some mechanism to reduce the voltage for this application. In many portable devices, a software interface is used to provide information about performance requirements. That information may be used, in turn, by a voltage regulator to reduce supply voltage based on the required speed at a given instance. The voltage regulator may be on-chip or off-chip, depending on the specific application.

A number of techniques for voltage regulation have been implemented in the industry or proposed in the literature. One such class of techniques include Dynamic Voltage Scaling (DVS). DVS is a voltage regulation feedback system that is used to dynamically control supply voltage according to performance requirements. By exploiting the variations associated with different computational requirements for a device at different times, the average energy of the device can be reduced while maintaining the same data throughput. When supply voltage and operating frequency are controlled dynamically according to a required computational load reported by a performance management circuit, the average energy of a transistor-based silicon device can be reduced significantly. From this reduction in energy, it logically follows that battery lifetime can be extended.

Existing DVS techniques are not without their significant drawbacks. For example, situations exist where the microprocessor on a chip suddenly demands high performance. This performance requirement may exceed the time response capabilities of the DVS system in place. In such situations, the supply voltage must be raised to the maximum power supply to guarantee peak performance under all adverse conditions and across all variables. Only after this rapid raise in supply voltage, and assuming relative stability in the ensuing operating frequency requirement, can the voltage regulator attempt to lower the voltage, if possible, to an optimum value which minimizes power consumption while guaranteeing a sufficient voltage swing for peak processor performance.

Other DVS techniques, including closed-loop voltage regulation systems, may rely on considerable trial-and-error testing prior to implementing a reliable model. Such trial-and-error techniques can be costly in terms of manpower, equipment, and time to market. In addition, such techniques may not be able to accurately track critical paths used in the processor for the purpose of estimating processor frequency requirements.

Still other DVS techniques may not be sensitive to all of the variations that impact device performance. For instance, the speed of an integrated circuit device depends on voltage, temperature, memory/logic structure, transistor threshold voltage, and process variations. DVS techniques that are not designed to account for each of these variations may not be efficient, and in some cases, may be inaccurate or may result in degraded or interrupted performance. When sudden performance increases are required, certain DVS techniques in this latter category must often raise supply voltage to a peak value that is the minimum value necessary to sustain performance requirements across all of these variables. However, this voltage may be unnecessarily high in light of one or more unaccounted-for variables, often resulting in an unnecessary taxation of battery power. If, as an illustration, a DVS regulator is not designed to recognize that a particular integrated circuit is operating at a fast process split, a larger than necessary supply voltage will likely be imposed on the system in the event of a sudden performance increase requirement. This unnecessary voltage margin can be unacceptable in the context of mobile applications, where preservation of battery power is particularly important.

A need exists in the art for a more robust and efficient dynamic voltage scaling architecture especially suitable for highly integrated mobile devices.

SUMMARY

In one aspect of the present invention, a method of regulating supply voltage of an integrated circuit device includes calculating a reference voltage at which the integrated circuit device is substantially insensitive to temperature variations, identifying a process split of the integrated circuit device by setting the supply voltage to the reference voltage and by measuring a corresponding reference frequency on the integrated circuit device, and regulating the supply voltage using characterization data corresponding to the identified process split.

In another aspect of the invention, a method of regulating supply voltage of an integrated circuit includes determining a process split for the integrated circuit, associating a plurality of voltages to the process split, each voltage corresponding to a target frequency of operation of a processing unit on the integrated circuit, and regulating the supply voltage to attain one of the target frequencies for the processing unit using a corresponding one of the voltages associated with the determined process split.

In yet another aspect of the invention, a voltage regulation apparatus for use on an integrated circuit device includes an automatic process identifier configured to identify a process split of the device, a memory circuit coupled to the automatic process identifier, the memory circuit configured to store data comprising target voltages for different process splits, a processing unit, a power supply, and a voltage regulator circuit coupled to the memory circuit and to the power supply, the regulator configured to adjust the power supply value according to the automatic process identifier and the memory circuit, the adjusted power supply causing the processing unit to operate substantially at a target frequency.

In yet another aspect of the invention, a method of regulating supply voltage of an integrated circuit device using a ring oscillator circuit for measuring frequencies corresponding to different voltages includes recording ring oscillator frequencies for different voltages at a plurality of process splits associated with a family of silicon devices in which the integrated circuit device is included, each of the ring oscillator frequencies corresponding to a target frequency of operation for a processing unit on the integrated circuit device, the voltages and corresponding frequencies comprising respective sets of characterization data for each process split, measuring, for the different voltages, an additional set of frequencies output from a ring oscillator on the integrated circuit device, identifying the two sets of characterization data representing two process splits having performance characteristics most closely above and below the performance characteristics characterized by the additional frequencies at the different voltages measured for the integrated circuit device, interpolating between the identified two sets of characterization data using the additional frequencies to identify a third set of data characterizing the integrated circuit device and comprising supply voltages necessary to achieve the corresponding target operating frequencies, and regulating the supply voltage to achieve the target frequencies using the supply voltages from the third set.

In yet another aspect of the invention, a voltage regulation apparatus for use in an integrated circuit device includes a processing unit, an identifier circuit configured to identify a process split for the integrated circuit device, a memory circuit coupled to the identifier circuit, the memory circuit containing characterization data for the identified process split, a critical path replica circuit comprising an output for providing frequency information approximating a critical path of the integrated circuit, a switch coupled to the memory circuit and the output of the critical path replica circuit, and a voltage regulator circuit coupled to the switch and a supply voltage of the integrated circuit device, the regulator circuit configured to adjust the supply voltage to achieve a desired target frequency of the processing unit.

In yet another aspect of the invention, computer readable media embodying a program of instructions executable by a computer program to perform a method of regulating a supply voltage of an integrated circuit device includes determining a process split for the integrated circuit, associating a plurality of voltages to the process split, each voltage corresponding to a target frequency of operation of a processing unit on the integrated circuit, and regulating the supply voltage to attain one of the target frequencies for a processing unit on the integrated circuit using a corresponding one of the voltages associated with the determined process split.

In yet another aspect of the invention, an integrated circuit device includes a processing unit, process identification means for identifying the process split of the integrated circuit, memory means for storing characterization data of the family of integrated circuit devices to which the integrated circuit device belongs, means for determining the characterization data for the integrated circuit device using the memory means and the process identification means, and voltage regulation means for adjusting the supply voltage using the characterization data for the integrated circuit device to achieve a desired target frequency of operation for the processing unit.

It is understood that other embodiments of the present invention will become readily apparent to those skilled in the art from the following detailed description, wherein it is shown and described only several embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 5 is a ring oscillator in accordance with an embodiment of the present invention.

FIG. 6 is an illustration of a silicon die including a core processor and a group of ring oscillators in accordance with an embodiment of the present invention.

FIG. 7 is a circuit configured to produce a direct measurement of on-die ring oscillators in accordance with an embodiment of the present invention.

FIG. 10A is a table showing characterization data at two process splits in accordance with an embodiment of the present invention.

FIG. 10B is a table showing characterization data of a candidate integrated circuit device in accordance with an embodiment of the present invention.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. For the purposes of this disclosure, the term "coupled" may refer to either a direct connection or, where appropriate in the context, a connection through intermediary circuitry or means.

Dynamic Voltage Scaling (DVS) can save power by lowering the supply voltage when parts are running faster than required. This phenomenon can occur, for example, for fast process splits from a silicon wafer yield, or operation of the integrated circuit device at cool temperatures. Performance can also be dictated by software, such as where the full target frequency of operation is not required in light of an impending application that may be less-computationally intense than the circuit is capable of handling. For faster process splits, parts can run at higher frequency and hence waste unnecessary power. The DVS according to the present invention can lower the voltage automatically for these faster parts and thereby conserve battery power while still maintaining, across all variables, the desired performance target.

Figures 1, 3A, 3B:
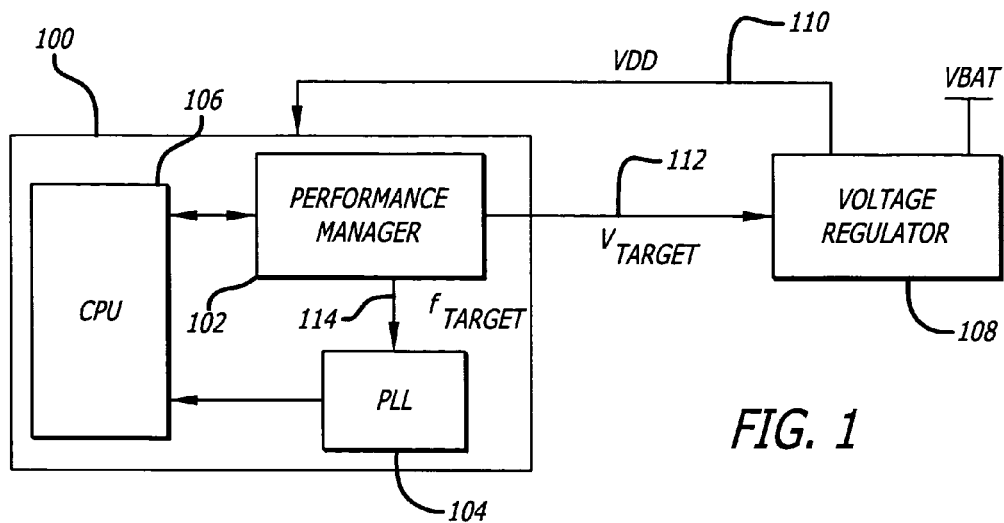
FIG. 1 is a block diagram of a dynamic voltage scaling architecture.
FIG. 3A is a ring oscillator look-up table in accordance with an embodiment of the present invention.
FIG. 3B is a main look-up table containing characterization data in accordance with an embodiment of the present invention.

FIG. 1 shows an illustrative block diagram of a dynamic voltage scaling system architecture 100. The performance manager 102 may be implemented as a software or firmware routine on the chip, or it may be included in a dedicated circuit or set of circuits. The performance manager 102 may use a software user interface to predict performance requirements and to convey information, in some configurations, to a user or another circuit or device. Once performance requirements for the impending task are determined by the performance manager 102, the performance manager 102 sets the supply voltage and frequency of the chip just necessary to accomplish the identified task(s). The target frequency $f_{target}$ identified by the performance manager 102 is transmitted to a phase-locked loop (PLL) 104 over path 114 to accomplish frequency scaling. That is, the PLL 104 tracks the input $f_{target}$ value and outputs an appropriate operating frequency for use by the on-chip CPU 106. Further, based on the target voltage $V_{target}$ sent by the performance manager 102 to the voltage regulator circuitry 108 via line 112, the voltage regulator 108 scales the supply voltage to meet this target, as shown by line 110.

The performance manager, which can be implemented using a variety of known configurations, may adjust the supply voltage according to performance requirements. Such requirements will vary dramatically depending on the particular application. In addition, more than one processing unit may reside on the same silicon device. In this instance, the performance manager may regulate the operating characteristics of more than one processor. In other implementations, more than one performance manager may be used.

In one open-loop performance manager configuration, voltage setting by the performance manager can be a one-time setting based on the entries contained within a lookup table (LUT). Alternatively, voltage setting can be based on the actual system performance as tracked by the performance manager. In implementations utilizing an LUT, different target operating frequencies along with the corresponding voltage supply settings may be used to set the voltage to the optimal value for minimizing power consumption. The LUT entries may be determined through characterization of the behavior of the silicon device at various extremes. In designing these characterization methodologies, sufficient margin should be added to the voltage supply to accommodate for worst case process and temperature variations. When the target voltage is set for a given application, an analog-to-digital converter (ADC) may be used to indicate when the voltage regulator has completed its voltage adjustment.

Another performance manager configuration involves a closed-loop feedback system. Actual system performance may be measured using either a ring oscillator or a replica of the critical path of the processing circuitry. Using this configuration, when system performance requires a change, the performance manager sets the target frequency. The error between the target and the measured frequencies is used by a feedback system to adjust the voltage to achieve the target performance.

Whether an open or closed-loop system performance monitoring system is chosen depends on a number of factors. Stability against temperature is a significant design parameter. The conventional LUT DVS stores the worst case performance numbers. In this event, operation under worst case process variation is ensured and temperature stability is guaranteed. Unfortunately, the large margin added to compensate for process and temperature variations can reduce energy savings significantly. Various aspects of the present invention address this shortcoming, as discussed below.

In a configuration where actual system performance is monitored, the system dynamically compensates for temperature variation using a closed-loop feedback system. Closed loop parameters and system response determine the time required by the closed loop to adjust voltage in response to an arbitrary temperature change. If the rate of change of temperature is faster than the closed-loop response time, the voltage regulator in this instance needs to temporarily depart from the closed-loop feedback system and ramp up the voltage to its worst case setting. The worst case setting may correspond to the worst case process and worst case temperature in order to guarantee the integrity of operation over all ranges. This panic mode—namely, where voltage must be changed to guarantee the maximum performance under all circumstances—may result in unacceptable consumption of battery power, and has not been addressed properly in conventional closed loop systems.

In one aspect of the present invention, a hybrid open/closed loop voltage regulator is disclosed. The voltage regulator includes mechanisms for one-time voltage setting and continuous performance monitoring. The disclosed voltage regulator may save significant amounts of energy by automatically identifying the process of the silicon device. Once the process is identified, the system selects supply voltage and operating frequency data points which correspond not to the worst case process split, but to the process split identified. Once the voltage reaches the target value as dictated by the LUT, the system starts monitoring the system performance using a closed-loop feedback system. In some configurations, the system monitors a critical path for temperature variations, and adjusts the supply voltage accordingly. Other implementations involve the use of a critical path replica for performing this "fine tuning" of the supply voltage after the initial setting by the open-loop system. During panic mode, the system switches back to consulting the entries in the LUT and ramps up the supply voltage to the maximum specified according to the particular split.

Accordingly, in one embodiment, the disclosed system operates in two distinct configurations: LUT mode and performance monitoring mode. An initial calibration step may be implemented for a particular silicon device. During this calibration step, some mechanism may be used to identify the specific process corner to which the chip belongs. When performance needs to be adjusted, the system commences operation using the LUT configuration. Once voltage is adjusted according to the values dictated in the LUT, the system switches to performance monitoring mode to fine tune performance and to compensate dynamically for temperature variations.

Figures 2, 4:
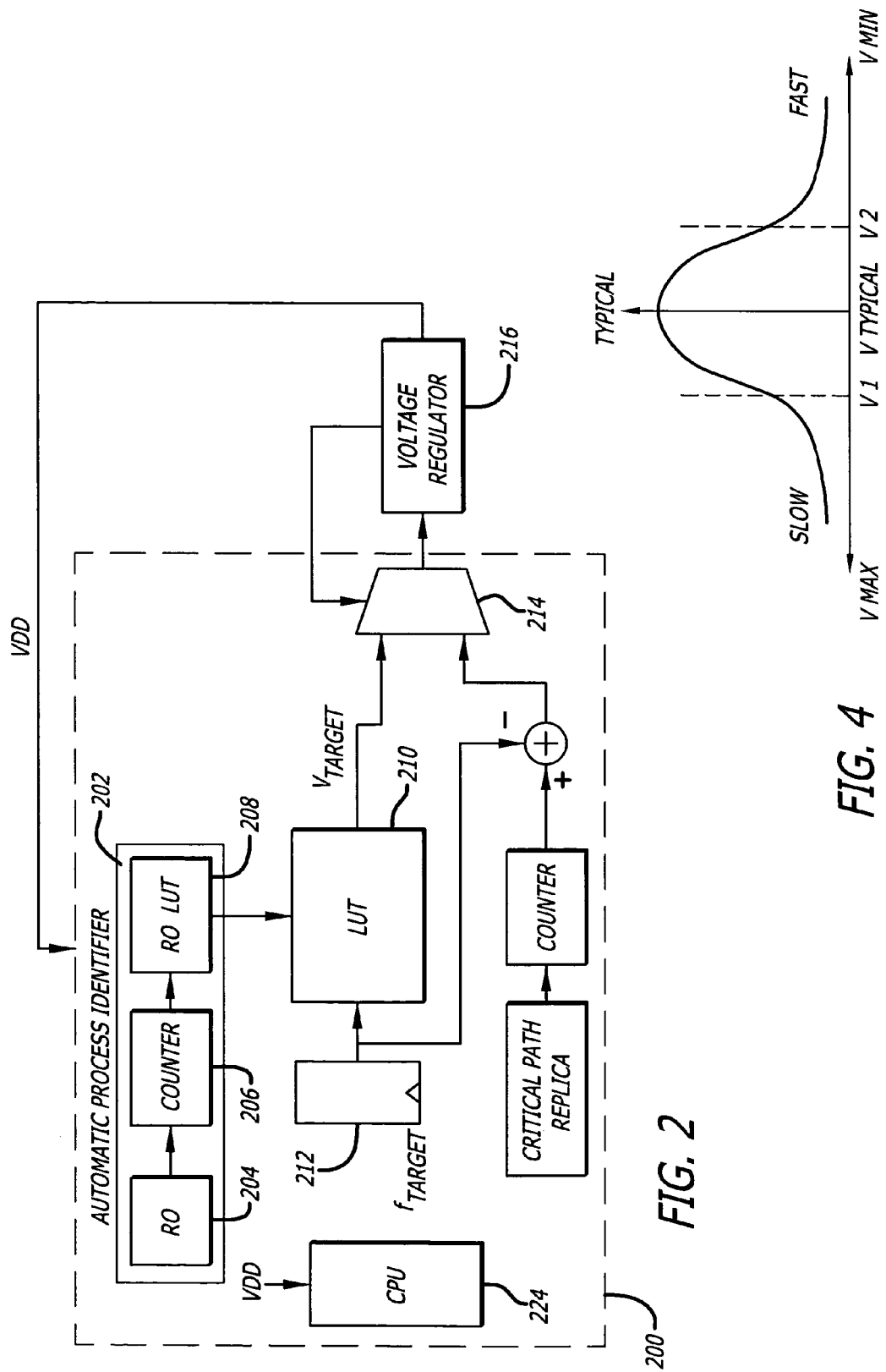
FIG. 2 is a block diagram of an architecture of the voltage regulation system in accordance with an embodiment of the present invention.
FIG. 4 is a graph showing a Gaussian distribution of a semiconductor yield.

FIG. 2 shows a block diagram of the architecture of a voltage regulator system 200 in accordance with an embodiment of the present invention. An automatic process identifier circuit (API) 202 may be used to identify the process corner during the calibration step. The API may include a ring oscillator circuit 204, a counter 206, and a ring oscillator look up table (RO LUT) 208. The API 202 may be used to accomplish automatic process identification. However, temperature variations may affect the correct determination of the process split in measuring a particular device. Process variations and temperature are typically the main factors affecting integrated circuit performance. For example, a slow process split at a cold temperature may be faster than a typical split at a hot temperature. The API 202 should be designed so that an accurate process split determination can be made without regard to temperature.

In certain implementations, calibration may be accomplished by fixing the voltage of the environment adjacent and within the integrated circuit to a specific value where circuit performance is insensitive to temperature. Generally, when temperature changes, the performance of logic path on a silicon device such as a CMOS circuit is affected by two main parameters: threshold voltage and channel mobility. Frequency at which a logic path can operate is approximated by $$f = \frac{I_{avg}}{L_D C_{avg} V}$$

where $L_D$ represents the logic depth of the path, $C_{avg}$ is the average capacitance, and $I_{avg}$ is the average current flowing through the path. The average current has the following proportional relationship:

$$I_{avg} \propto \mu(T)(V_{DD} - V_{TH}(T))^\alpha$$

where $V_{DD}$ is the supply voltage, $\mu(T)$ is the channel mobility at temperature T, and $V_{TH}(T)$ is the threshold voltage at zero bias and at temperature T. Channel mobility and threshold voltage dependence on temperature can be represented as follows:

$$\mu(T) = \mu(T_0)\left(\frac{T}{T_0}\right)^{-M}$$

and $$V_{TH}(T) = V_{TR}(T_0) - k(T - T_0)$$

where $T_0 = 300K$, M is the mobility temperature exponent, and k is the threshold voltage temperature coefficient. Typical values for M and k are 1.5 and 1.8 mV/K, respectively.

The above relationships reflect that, by lowering the supply voltage, the temperature effect on threshold voltage starts to cancel out the temperature's effect on channel mobility. A specific voltage is reached where logic performance becomes insensitive to temperature. Because the effect of temperature has been cancelled out, the only influence on performance relates to process variations. As a result, this voltage can be used to identify the process split for the device at issue.

Referring back to FIG. 2, the voltage $V_{DD}$ supplied to the API 202 is set to its temperature insensitive value, using in one embodiment the equations above. The API 202 includes a ring oscillator 204 which outputs a signal at a frequency specific to that temperature insensitive voltage. A counter 206 in some implementations reads the frequency of the ring oscillator 204. The counter 206 is coupled to a small ring oscillator look-up table (RO LUT) 208. The look up table 208 may contain entries characterizing the various process splits at the voltage-insensitive temperature. In one embodiment, the table 208 has only the number of entries corresponding to the number of splits to be considered. The ring oscillator look up table may be indexed by the ring oscillator frequency from the counter 206 as indicated by the exemplary ring oscillator look up table in FIG. 3A. The first entry in the look-up table, $V_{START}$, represents the calculated value of voltage insensitive to temperature. The remainder of the entries may be indexed by the ring oscillator frequency. In the example of FIG. 3A, a first output ring oscillator frequency $f_1$, corresponds to PROCESS$_1$, (e.g., slow), a second output ring oscillator frequency $f_2$ corresponds to PROCESS$_2$ (e.g., typical), and so on. In other embodiments, the output ring oscillator frequency may be used to index processor frequencies or target ADSP frequencies, which may be used, directly or indirectly, to identify the process split for the device at hand.

In FIG. 2, the output of the ring oscillator look up table 208 may be coupled to the input of a main look up table (main LUT) 210. In an initial data collection phase which may be performed prior to mass producing the family of integrated circuit devices, the process characteristics of a family of identical integrated circuit devices can be measured, and data relating the frequency of operation to the supply voltage can be recorded at various process splits, such as slow, typical and fast. In one embodiment, the main LUT 210 is formulated with values associating the various process splits of the family of integrated circuit devices with various supply voltage requirements. The device may be characterized for operation at both room temperature and hot temperatures to account for extra voltage margin at high temperatures. FIG. 3B shows a simplified example of the main LUT 210. At each of three process splits Slow, Typical, and Fast, a plurality of frequencies correspond to a plurality of voltages. The greater the number of entries in LUT 210, the finer the granularity of adjustments that can be made to the supply voltage to achieve a target frequency. In addition, as noted above, split compensation may be accomplished in LUT 210 by characterizing the device for the different processes at other temperatures, such as high temperature. In some implementations, the total number of rows in FIG. 3B is equal to the required number of the different target frequencies set by the software interface or performance manager. The LUT in one embodiment contains as many entries as feasible given the memory availability to accommodate for different process splits and different temperatures.

In one embodiment, the API 202 identifies the process of the integrated circuit device at issue during a system calibration phase. The target voltage is set to the temperature insensitive value $V_{START}$ of the process identification ring oscillator 204. The ring oscillator frequency may then be used to index the different values stored in the ring oscillator LUT 208, either directly or via a counter mechanism 206 including one or more counters or other circuitry. In this manner, the ring oscillator 204 may identify the process specific to the integrated circuit, which information may be conveyed to the main LUT 210. The target supply voltage may then be set according to the target frequency for the process identified. The target voltage is used by the voltage regulator to adjust supply voltage to reach the target frequency of operation.

In many instances, the performance characteristics of the process split identified by the API 202 lie between the performance characteristics of two process splits stored in look up table 210. That is, the process split determined by API 202 is flanked by two process splits recorded in look up table 210, with one process split having performance characteristics just above the identified process split and the other process split having performance characteristics just below the identified process split. In this case, a graphical or analytical interpolation method may be used to identify the actual characterization data (supply voltages for different frequencies) that should be used for that particular integrated circuit device. This method is described further, below.

In some embodiments, the initial target voltage set using the LUT 210 is the voltage at the identified process corner taking into account the effects of high temperature. That is, the LUT 210 in these embodiments takes into account measurements for the devices at both different splits and high temperature. For high temperature, the supply voltage generally needs to increase in order to achieve a target frequency of operation. The LUT 210 can take these worst case scenarios into account by adding a margin to the supply voltage to account for worst-case temperature variations.

The LUT 210 may be coupled to a counter or other circuit 212 that identifies the desired target frequency of operation for a processing unit (CPU) 224 on the device. Knowing the target frequency, the LUT 210 can be indexed to identify the associated characterization data (supply voltages) necessary to attain that frequency. A target voltage $V_{Target}$ may be identified that represents the voltage required to attain the target operating frequency. This value may be output through a switch or multiplexer circuit 214 to a conventional voltage regulator circuit 216, which adjusts the power supply value $V_{DD}$ accordingly. In other embodiments, information regarding the target frequency may come from a software interface, the performance manager, or separate circuitry.

In one embodiment as shown in FIG. 2, a hybrid open-loop/closed loop voltage regulation circuit may be implemented. The open-loop system includes API 202, main LUT 210, switch/multiplexer 214, and voltage regulator 216. The closed-loop system may include critical path replica 222, counter 220, adder/subtractor 218, switch/multiplexer 214, and voltage regulator 216. In one embodiment, the API 202 is used to identify the process corner during calibration. The target voltage is set to the temperature insensitive value of the process identification ring oscillator 202. The ring oscillator frequency may be used to index the different values stored in RO LUT 208. Accordingly, the ring oscillator 202 identifies the process to the main LUT. The target voltage is thereupon set according to the target frequency for the process identified. Target voltage is used by voltage regulator 216 to reach the target. In initial open-loop power supply settings according to some embodiments, the power supply is set at a voltage which takes into account worst-case temperature for the identified split.

Once the voltage settles at the target voltage identified by the main LUT 210, the voltage regulation system 200 may switch to a closed loop configuration. In this latter configuration, the target frequency may be compared to the frequency of a critical path, or a critical path replica, for voltage fine tuning. In one embodiment, a suitable critical path replica may be used for this closed-loop feedback system.

More specifically, in the embodiment of FIG. 2, the target voltage is output to a switch or multiplexer circuit 214 controlled by voltage regulator 216 (see input 230). When the device goes into closed-loop operation, the voltage regulator 216 may issue a control signal to circuit 214. In addition, counter 212 may be coupled to the main LUT 210 and an adder or subtractor circuit 218 to identify the target frequency of the CPU 224 (as opposed, for example, to the frequency of the ring oscillator 204). The CPU target frequency may be deduced based on information about the ring oscillator frequency and corresponding process corner, etc. In some embodiments, the circuit 212 may be incorporated within the API 202 or the voltage regulator 216. A critical path replica 222 which may include a matched ring oscillator circuit produces a signal whose frequency may be measured by counter 220. The output frequency of the critical path replica 222 may then be compared with the target frequency via adder 218. The frequency difference is then output via circuit 214 to the voltage regulator 216. Thereupon, the voltage regulator may make any necessary adjustments to the supply voltage $V_{DD}$ based on this frequency difference. In essence, the target frequency of the processing unit is compared to the frequency of the critical path replica 222 for fine-tuning. A small voltage margin may also be added to the power supply to compensate for any mismatch between the real critical path and the replica 222.

During panic mode or increasing performance requirements, the voltage regulator 216 may switch the system back to open-loop configuration by changing the state of the signal to multiplexer circuit 214. In this instance, the system switches back to the peak voltage required by the split, rather than the worst case split. The regulator may also switch back to open-loop mode in instances where variations in the target frequency are too fast for the closed-loop system to track.

The disclosed DVS system and method can save significant amounts of energy by, among other things, setting supply voltage to the worst case temperature for the closest split. Conventional DVS systems, in contrast, set supply voltage for the worst case split (i.e., slow). FIG. 4 shows a Gaussian voltage distribution as a result of process variations at a fixed frequency. For the slow split, the voltage is at a maximum, while at a fast split, the voltage can be reduced to a minimum and still maintain the required performance.

As noted above, the main LUT 210 may contain more entries to accommodate different process splits and different temperatures. The LUT in some embodiments has three columns: (i) the frequency of the ring oscillator, (ii) the target core frequency; and (iii) the corresponding target voltage to obtain those frequencies. It should be noted that the LUT can be constructed in a variety of ways using different row and column structures, different parameters, and more than one table, all without departing from the scope and spirit of the present invention. In one embodiment, the LUT contains 100 entries that include ten variations to account for 10 different process splits, and ten entries to account for temperature variation. In other embodiments the LUT may contain many more entries.

As noted previously, energy has a quadratic dependence on voltage. As the number of entries in the main LUT is increased, the expected energy savings likewise increase in light of the finer granularity of the system's voltage regulation mechanism. The effect of increasing the number of entries on energy savings may be analyzed by taking into account the 3-σ process distribution.

The LUT in some implementations contains information about three different splits: slow, typical and fast. Assuming a 3-σ process distribution, the cumulative probability density function (CDF) of the voltage being between fast and typical is 50% and the voltage being at fast conditions is only 1%. Therefore, 50% of the parts from a given wafer yield can save energy by reducing supply voltage from $V_{max}$ to $V_{typ}$ while only 1% of the parts would benefit from reducing voltage from $V_{max}$ to $V_{min}$. In this case, the energy savings resulting from the use of voltage-frequency data of three different splits in the LUT is given by the following equation:

$$E_{savings} = 0.5\left[1 - \left(\frac{V_{typ}}{V_{max}}\right)^2\right] + 0.01\left[1 - \left(\frac{V_{min}}{V_{max}}\right)^2\right]$$

Taking $V_{min}$=1.0 volts and $V_{max}$=1.5 volts for an illustrative frequency of 200 MHz, energy savings is approximately 15%. If the number of splits stored in the LUT is increased, energy savings are correspondingly increased. For example, assuming that 4 different splits, slow, $-\sigma$, $+\sigma$, and fast, are used in the LUT, the CDF for $-\sigma$ and $+\sigma$ are approximately 62.5% and 18.75%, respectively. Energy savings in this latter instance average 20%.

Critical Path Monitoring

The closed loop configuration of the voltage regulation system may be implemented by different configurations. Monitoring the real critical path of a system, in theory, leads to the highest accuracy, because no margin needs to be added to account for errors to account for an estimated replica path. If other performance monitors are used, the accuracy is reduced depending on, among other factors, how much the monitor is in actuality mimicking the critical path. Using the critical path as a performance metric has certain drawbacks. For example, signal propagation down the critical path may not occur every clock cycle, which would yield false information regarding system performance. With no activity on the real critical path, the DVS system may wrongly consider that the present voltage setting is sufficient when in actuality it may be insufficient. Generally, for this reason, a real critical path is not relied upon by a voltage regulation system as the sole source of information for voltage scaling. In one embodiment, a ring oscillator having guaranteed signal activity every clock cycle may be included in addition to monitoring the real critical path. The ring oscillator in this embodiment may be in addition to the ring oscillator discussed above in connection with the API circuit 202 of FIG. 2.

In configurations where the critical path is monitored, the designer should take care to ensure that the monitoring logic does not place an unnecessarily large load upon the critical path.

Critical Path Replica

In some embodiments, a replica of the critical path is duplicated. The replica may take into account the fan-out and wiring capacitance of the real critical path by using emulating circuitry. Because some deviation between the real critical path and a designed replicate will naturally exist, a voltage margin may be added to the target voltage supply to account for this mismatch. In most cases, the frequency mismatch should be positive. That is, the replica should be running faster than the real critical path, which helps eliminate the possibility of a system crash due to an inadequate supply voltage.

Using a critical path replica essentially amounts to estimating the performance of a portion of the circuitry given a certain supply voltage. High accuracy is desired for the critical path replica. In one embodiment, the real critical path of the logic/processing circuitry is simulated, taking into account wiring delays, coupling delays, process variations, etc. Because propagation delay is proportional to CV/I (capacitance times voltage/current), the performance estimate circuit should have proportional CV/I characteristics. Additionally, because supply voltage is being varied, the performance estimate circuit should have similar C/I characteristics as the critical path. A simple ring oscillator circuit, to the first order, has a fixed C/I characteristic, independent of the W/L transistor ratio sizes of the inverter stages. The same is true for a ring oscillator with a fixed fan-out. If a ring oscillator circuit with a fixed load capacitance is built, the C/I ratio would depend on the inverter W/L sizes as well as the value of the fixed load capacitance. Hence, the W/L ratio and the capacitor size can be tuned to substantially match the critical path. Accordingly, a superior estimate of the critical path can be achieved.

Using this methodology, a principle objective is critical path delay matching using the following relationship:

$$\frac{f_1}{f_2} = \left[\frac{\left(\frac{I_1}{C_1 V}\right)}{\left(\frac{I_2}{C_2 V}\right)}\right] = \left[\frac{\left(\frac{I_1}{C_1}\right)}{\left(\frac{I_2}{C_2}\right)}\right]$$

The above equation establishes that, where two circuits have the same I/C relationship, their scaling behavior is approximately the same. By fixing one parameter, C (in the I/C relation, the (I/C) slope, i.e., voltage frequency scaling, of one circuit can be made to match that of another circuit. In light of the voltage-frequency scaling characteristics of the critical path, the (I/C) relationship is assumed to be linear with respect to voltage. A ring oscillator may then be built using a fixed capacitance at the output of each gate. The capacitance added to the ring oscillator circuit may be modified until the (I/C) slope of the ring oscillator is approximately equal to that of the critical path. Once the ring oscillator capacitance is adjusted to produce the same (I/C) slope as the critical path, scaling of the ring oscillator over process and temperature becomes approximately similar to that of the critical path. The ring oscillator may in one embodiment include a five-stage NAND2 or NOR2 oscillator.

DVS Based on Process Split

In another aspect of the present invention, a DVS is disclosed that scales the frequency of the integrated circuit device based upon the process split to attain a target frequency for an internal processing core of the integrated circuit device. This implementation of DVS takes voltage, temperature, memory/logic & threshold voltage variations into account. In this embodiment, the target frequency may constitute the operating frequency of a processor core in the device, or the frequency of a ring oscillator required to achieve this target frequency. In one example, the integrated circuit device is part of a portable mobile communication system. One core which may be appropriate for voltage regulation is an application digital signal processor (ADSP) such as a vocoder. A ring oscillator may be constructed on the chip which can be used to find the minimum supply voltage required to achieve the intended ADSP frequency. In most cases, where the frequency of the ring oscillator differs from that of the target ADSP frequency, the ring oscillator frequency nevertheless correlates well with that of the ADSP frequency. Further, the ring oscillator frequency is easily measurably during the initial process of device calibration.

The ring oscillator may be simple (e.g., three stages) or may be complex with many stages or a more elaborate stage architecture. An exemplary CMOS ring oscillator is shown in FIG. 5. The circuit includes three simple inverter stages 510, 512 and 514. The first stage 510 includes appropriately sized P-type transistor 500 and N-type transistor 501. The second stage 512 includes P-type transistor 502 and N-type transistor 503. The third stage 514 includes P-type transistor 504 and N-type transistor 505. The ring oscillator circuit also includes an enable function implemented by enable input EN 508 driving P-type transistor 507 and N-type transistor 506. When EN 508 is turned high or to a logic true, transistor 507 turns off, transistor 506 turns on and the inherent instability in the ring causes the inverter based structure to produce an $osc_{13}out$ oscillating frequency at output 509. This $osc_{13}out$ can be measured for calibration purposes.

In some implementations, it may be desirable to place more than one, or several, ring oscillators on a given die. Reasons for multiple oscillator placements may include increased accuracy of die frequency measurement, or multiple cores on the same die. Various types of ring oscillators may be implemented to estimate the maximum frequency of blocks on the die, including, for example, delay dominant, gate delay dominant, and diffusion dominant ring oscillators.

FIG. 6 shows an example of a digital die 600 upon which ring oscillators are placed. The die 600 includes built-in ring oscillators 602, 604, 608, 610 and 612. Also present adjacent ring oscillator 610 is a processor core 612, such as a DSP or ARM-based core. In one embodiment, each ring oscillator will include its own frequency estimation circuitry. In addition, to accommodate different types of circuits or critical paths for voltage regulation purposes, the ring oscillators may be designed to operate at different frequencies.

The frequency(ies) of the ring oscillator(s) in these implementations may be measured in one of several ways, depending on the implementation. In a direct method, the output of the ring oscillator core(s) can be directly measured using an oscilloscope or similar external device. FIG. 7 shows an example of a direct measurement circuit in accordance with an embodiment of the invention. The example shows two ring oscillator cores 702 and 704 and logic circuits 703 and 705. Ring oscillator core 702 may, as an illustration, be designed to oscillate in the 5-10 MHz range at a voltage swing of 1.8 volts. Ring oscillator core 704 may be designed to oscillate at a higher frequency range of 20-50 MHz at between 0.8 volts and 1.8 volts. Core 704 in this example provides a higher frequency clock that may be useful for correlation with an associated DSP, ARM processor, or the like. The circuit in FIG. 7 also includes a multiplexer 706 controlled by input signal 714. The multiplexer 706 feeds one of the two signals, as dictated by logical input 714, into an appropriate frequency divider circuit 708. The scaled frequency may then be measured directly at output 710, which in one embodiment may be fed out to a dedicated pin resident on the integrated circuit device. In addition, the oscillator frequency of core 704 can be read directly in this embodiment from output 712, which may also be fed out to its own dedicated pin, or multiplexed onto a pin shared with other uses.

In this direct method, an external measuring device (i.e., an oscilloscope or equivalent) may be employed. In situations where it is undesirable to perform calibration procedures using such external measuring devices, a relative method of measuring oscillator frequency may also be used.

Figure 8:
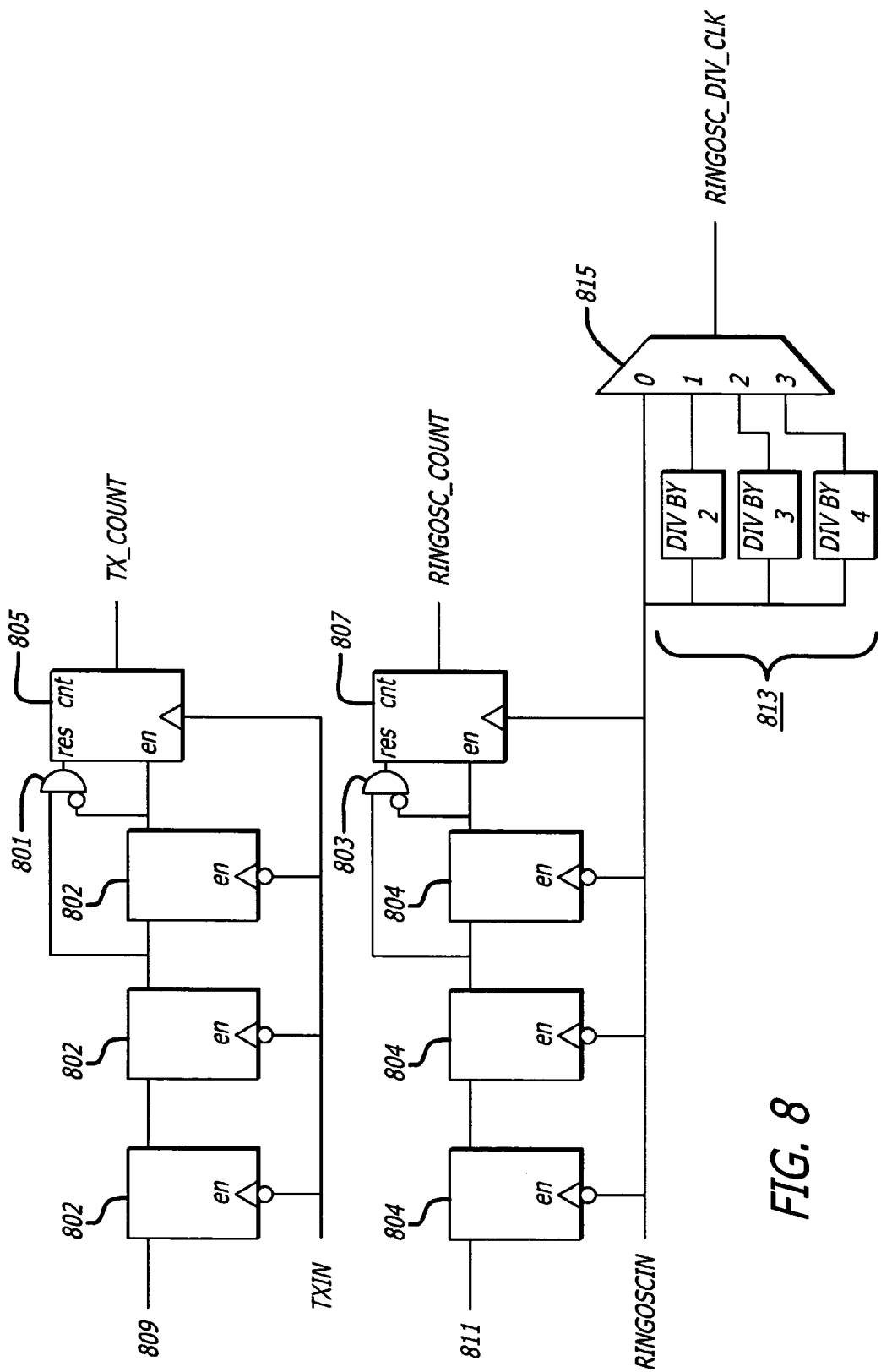
FIG. 8 is a circuit configured to produce a relative measurement of an on-die ring oscillator in accordance with an embodiment of the present invention.

FIG. 8 shows a circuit showing an embodiment of this relative method. In this embodiment, an external frequency measuring device is not required, and calibration of the integrated circuit device may be performed via software or logic circuitry on the die. In this relative method, two pairs of 20-bit counter sets 802 and 805, and 804 and 807 are implemented along with AND gates 801 and 803 having an inverted input. The input to each counter set is the transmit clock TXIN and the ring oscillator signal RINGOSCIN. Thus, the first counter is enabled by the transmit clock, and the second counter is enabled by the ring oscillator. In some implementations, the counters are enabled simultaneously by software and then permitted to run for a designated amount of time (typically less than 20 mSec). After that time, software disables the counters and reads the count value. The ring oscillator clock may also be divided using dividers 805 and multiplexer 807 to make it suitable for comparison with the transmit clock. The ring oscillator frequency may then be determined using the following formula:

$$f_{ring} = f_{tcxo} \frac{(N_{ring})}{(N_{tcxo})}$$

Here, $f_{ring}$ represents the frequency of the ring oscillator, $t_{tcxo}$ represents the frequency of the transmit clock, $N_{ring}$ is the count from the ring oscillator, and $N_{tcxo}$ is the count from the transmit clock. Using this relative method, the frequency of the ring oscillator can be measured without resort to any external hardware. In another embodiment, a circuit is included to disable the counter after it counts up to its maximum value, which renders the measurement process more efficient.

To implement the DVS in one embodiment, the ring oscillator frequency that results in the target operating frequency for the processing unit at issue may be estimated. That is, a given ring oscillator frequency may be correlated with a known target operating frequency. In one embodiment, the independent variable voltage is set to various values, and the dependent variable ring oscillator frequency is measured at room temperature. Then, a room temperature characterization graph such as the one shown in FIG. 9 may be consulted.

Figure 9:
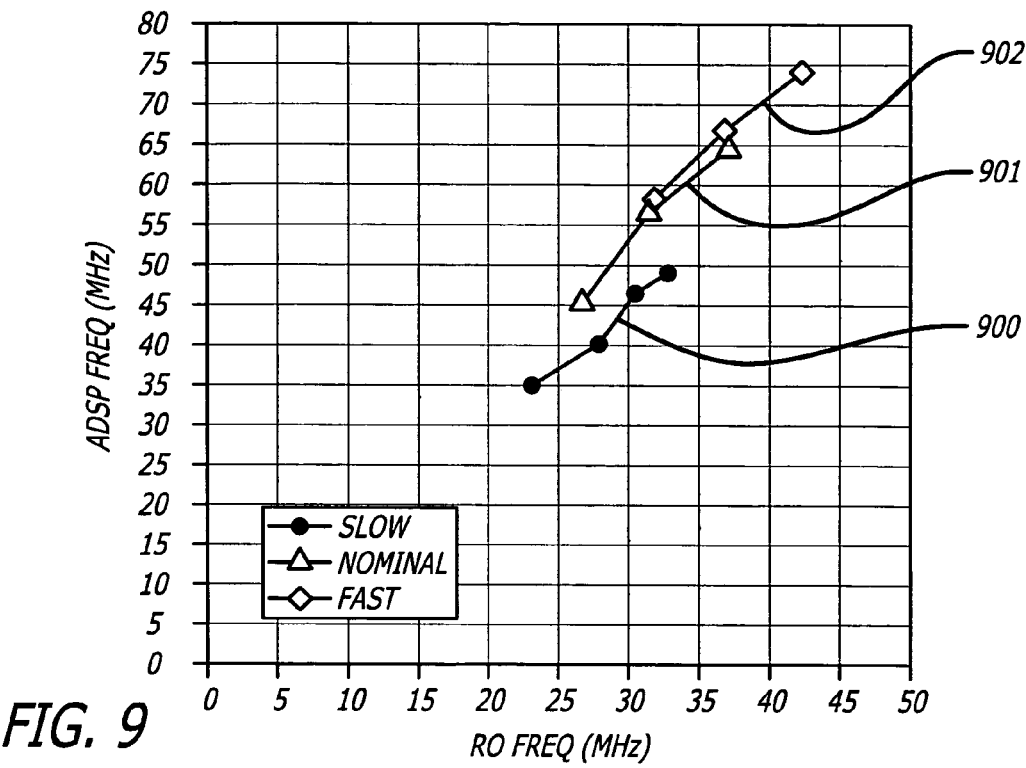
FIG. 9 is a graph of processing frequency versus ring oscillator frequency at room temperature in accordance with an embodiment of the present invention.

FIG. 9 is a graph representing an exemplary compilation of laboratory measurements correlating the frequency of an application digital signal processor (ADSP) to the frequency of a ring oscillator adjacent the ADSP on the die. The ring oscillator frequencies are based on known variations in voltage. Graphs for three process splits 900, 901, and 902 may be consulted to establish the target ADSP frequency for a given ring oscillator frequency read from the die. In many applications, the ADSP frequency is not a directly measurable parameter. Accordingly, these ADSP target frequencies may be deduced graphically or analytically from the ring oscillator frequencies (see below). Note that the target ADSP frequency should also be correlated with the ring oscillator frequency for cold and fast temperatures, and appropriate graphs for these measurements may be generated as well. In another embodiment, a look up table is used containing data points correlating the ring oscillator frequency to the target ADSP or processor frequency.

DVS in this aspect may be accomplished in two discrete phases. The first phase may be performed prior to mass producing the chips. Data characterizing the different process variations is obtained from the silicon manufacturer and/or generated through simulation. The frequency of operation of an internal core that reflects the system performance (e.g., ADSP frequency) is correlated with the easily measurable ring oscillator frequency of the chip. Correlation may be performed at different voltage settings for different process splits (e.g., slow, nominal and fast) under room temperature (25 C) conditions. Additional, ring oscillator frequency is also measured over voltages and splits at hot (125 C) temperature. The correlation data may be represented in the form of a chart or table and is referred to the characterization data of the chip. For the purposes of this disclosure, the term "characterization data" may include either voltages or frequencies, or both, that correspond to a particular process split of a family of integrated circuit devices, in some cases at a specific temperature.

FIG. 10A is a table containing characterization data for the voltage, ring oscillator frequency, and measured ADSP frequency for two different process splits. At a supply voltage of 1.2 volts at a fast process split, for example, the measured ring oscillator frequency is 50 MHz. The ADSP frequency associated with that oscillator frequency is 84 MHz, as seen from the graph. In actuality, the table may be significantly more detailed and may cover a larger number of process splits. The table may also incorporate characterizations at different temperatures, including a worst-case high temperature. For ease of explanation and to avoid obscuring the concepts of the present invention, however, a simpler table is used in this illustration.

The second phase of the DVS according to this aspect may be performed on a specific integrated circuit device during a calibration phase. For example, where the device is embedded in a mobile phone, the second phase may be performed during a phone calibration procedure. In an example where three process splits are characterized, the performance of an arbitrary device will either fall in between slow and nominal splits, or nominal and fast splits. The two sets of characterization data (from the first phase) that flank the arbitrary device's data may then be chosen.

FIG. 10B is a table generated after performing measurements on a specific integrated circuit device. Note that the oscillator frequencies in FIG. 10B fall between the fast and nominal process splits shown in FIG. 10A. Accordingly, the data corresponding to the slowest process split (nominal in this example) may be chosen as the base characterization for all devices.

In one embodiment of this DVS aspect, the actual characterization data to be used is modified based on the two chosen sets of characterization data that flank the characterization data of the arbitrary device. For example, where the arbitrary device is found to have characterization data that falls in between the characterization data of the fast and nominal process splits, an interpolation method can be used to deduce a new set of characterization data specific to that device—i.e., supply voltages that ensure a minimum ring oscillator frequency and hence a minimum processing speed. In these embodiments, the supply voltages used can be lower than those characterizing the lower process split, thereby conserving even more energy and saving battery power.

Figure 11:
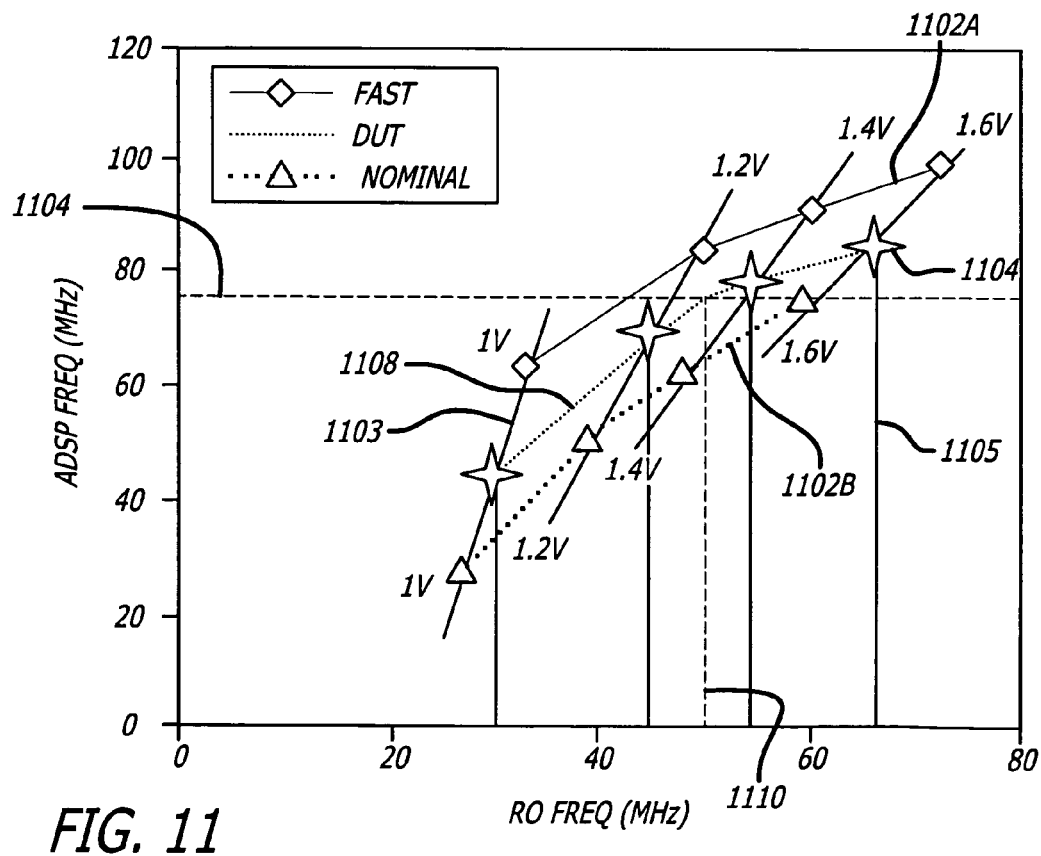
FIG. 11 is a graph showing characterization data for a family of integrated circuit devices and a device under test, in accordance with an embodiment of the present invention.

Depending on the configuration, graphical or analytical methods may be used to determine the actual supply voltages that will be used by the regulation system. An illustration of a graphical method is shown in FIG. 11. The graph represents a plot of processing (ADSP) frequency (MHz) versus ring oscillator frequency (MHz). A first curve 1102A corresponding to characterization data in the case of a fast process split is shown. A second curve 1102B corresponding to characterization data in the case of a nominal process split is also shown. Assume for purposes of this example that the target operating frequency is 75 MHz. This frequency value is reflected by horizontal dashed line 1104. Curves 1102A and 1102B represent a plot of the ADSP (processing using) frequency versus Ring Oscillator frequency at different voltage points as shown graphically in FIG. 10A. Using the graphical method, translating the data from FIG. 10A to graphical form represents the first step in this illustrative process of identifying the proper characterization data associated with the different process splits. For clarity and to avoid obscuring the concepts of the present invention, only nominal (typical) and fast process splits are shown.

Next, a line may be drawn through identical voltage values, as shown by the exemplary line 1103 in FIG. 11. Four such lines may be drawn in this illustration, for 1.0 volts, 1.2 volts, 1.4 volts, and 1.6 volts, respectively. Next, the actual ring oscillator frequency measurements of the candidate device from FIG. 10B are marked on the graph, as typified by point 1104. Four such marks are inserted into the graph in this example, including marks for ring oscillator frequencies of 30 MHz, 45 MHz, 54 MHz, and 66 MHz. As noted previously with respect to FIG. 10B, these values are the four frequencies measured by the ring oscillator at respective voltages 1, 1.2, 1.4 and 1.6 volts in the actual device under test (DUT). Next, vertical lines may be drawn that originate from the marked voltage points 1104 to their corresponding ring oscillator frequencies, as shown by exemplary line 1105. Four such vertical lines are drawn.

A smooth curve may then be drawn through the four nominal voltage points (1108). This curve represents the ring oscillator frequency versus the processing target frequency for the four different voltage points of the candidate device. In this instance, the performance characteristics of this device fall below those of the fast process split, and above those of the nominal process split. From the new curve 1108 of the candidate device, the ring oscillator frequency that corresponds to the target ADSP frequency can be deduced. For example, from FIG. 11, if the target operating frequency is 75 MHz (see line 1104), the ring oscillator frequency of the candidate device that produces the target frequency is 50 MHz (see vertical line 1110). From FIG. 11, a simple device ring oscillator frequency versus supply corresponding supply voltage curve may be constructed. The last step is to read the supply voltage value that corresponds to the target ring oscillator frequency. That voltage value may then be employed by the regulator to sustain a processor performance of 75 MHz.

In some situations, calculating characterization data for a graphical method may be considered to be too cumbersome given the application. Accordingly, an analytical method for calculating the data may be used in other embodiments. The analytical method may be broken down into two steps. In the first step, a user, program or circuit can interpolate the ADSP frequency using corresponding data points from the two characterization curves, thereby providing data for the table in FIG. 10B. The relationship is as follows:

$$f_{dev,adsp} = (f_{dev,ro} - f_{slow,ro}) \frac{(f_{fast,adsp} - f_{slow,adsp})}{(f_{fast,ro} - f_{slow,ro})} + f_{slow,adsp}$$

From the above equation, the target operating frequency of the processing unit can be calculated using the upper and lower bounds for the ring oscillator frequency and the processing frequencies. This frequency can be measured for different supply voltages.

The second step includes calculating the device voltage and ring oscillator frequency at the target ADSP frequency by interpolating between the device's voltage data points and the corresponding interpolated ADSP frequency from one or more measure ring oscillator frequencies. The relationship can be expressed as follows:

$$V_{min} = (f_{target} - f_{lo}) \frac{(V_{hi} - V_{Lo})}{(V_{hi} - V_{lo})} + V_{lo}.$$

Once the target ring oscillator frequency of the device from either the graphical or analytical method described above is attained, the voltage differential at this target ring oscillator frequency between hot and room temperature curves (or by further interpolation) of the faster characterization curve may be obtained. Typical values of this differentially may be 50-100 mVolts in some configurations. This value may be added to the $V_{DD}$ result from the above methods to compensate for the temperature variable of the device speed equation.

In the above illustration using the data in FIG. 11, a resulting $V_{DD}$ of 1.3 volts was obtained. Adjusting for temperature, the final $V_{DD}$ is 1.4 mV. If this system were not implemented, all devices in this example would have to be set to 1.6 volts to match the requirements at the worst case process split. That number, in turn, would have to be increased to account for all of the other variables that affect speed.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A voltage regulation apparatus for use on an integrated circuit device, comprising:
    an automatic process identifier configured to identify a process split of the device;
    a memory circuit coupled to the automatic process identifier, the memory circuit configured to store data comprising target voltages for different process splits;
    a processing unit;
    a power supply; and
    a voltage regulator circuit coupled to the memory circuit and to the power supply, the regulator configured to adjust the power supply value according to the automatic process identifier and the memory circuit, the adjusted power supply causing the processing unit to operate substantially at a target frequency.

2. The apparatus of claim 1, further comprising
    a switching device comprising a plurality of inputs and an output, a first one of the inputs of the plurality coupled to the memory circuit and the output coupled to the voltage regulator; and
    a closed-loop feedback circuit coupled to a second one of the inputs of the plurality, the feedback circuit configured to adjust the power supply voltage.

3. The apparatus of claim 2, wherein the closed-loop feedback circuit comprises a critical path replica circuit configured to approximate a critical path of the processing unit.

4. The apparatus of claim 2, wherein the switching device is configured to select between adjusting the power supply based upon the automatic process identifier and the closed-loop feedback circuit.

5. The apparatus of claim 3, wherein the closed-loop feedback circuit further comprises a counter for measuring an output frequency of the critical path replica.

6. The apparatus of claim 1, wherein the memory circuit contains data comprising a plurality of target frequencies, the target frequencies corresponding respectively to each of the target voltages.

7. The apparatus of claim 5, wherein the memory circuit contains data comprising a plurality of target frequencies, the target frequencies corresponding respectively to each of the target voltages.

8. An integrated circuit device comprising:
    a processing unit;
    process identification means for identifying the process split of the integrated circuit;
    memory means for storing characterization data of the family of integrated circuit devices to which the integrated circuit device belongs;

means for determining the characterization data for the integrated circuit device using the memory means and the process identification means; and voltage regulation means for adjusting the supply voltage using the characterization data for the integrated circuit device to achieve a desired target frequency of operation for the processing unit.

9. The integrated circuit device of claim 8, wherein the memory means includes characterization data for worst case temperature variation for each process split.

10. A method of dynamic voltage scaling, comprising:

identifying the process split of an integrated circuit;

storing characterization data of a family of integrated circuit devices to which the integrated circuit device belongs;

determining the characterization data for the integrated circuit device using the stored characterization data of the family of integrated circuit devices and the identified process split of an integrated circuit; and adjusting the supply voltage using the characterization data for the integrated circuit device to achieve a desired target frequency of operation for the processing unit.

11. The method of claim 10, wherein the storing of characterization data includes storing characterization data for worst case temperature variation for each process split.

12. A computer program product for dynamic voltage scaling, comprising:

instructions stored in a computer readable medium, when executed, the computer readable medium directing the computer to perform the actions of:

identifying the process split of an integrated circuit;

storing characterization data of the family of integrated circuit devices to which the integrated circuit device belongs;

determining the characterization data for the integrated circuit device using the stored characterization data of the family of integrated circuits devices and the identified process split of an integrated circuit; and adjusting the supply voltage using the characterization data for the integrated circuit device to achieve a desired target frequency of operation for the processing unit.

13. A computer program product of claim 12, wherein the action of storing characterization data includes storing characterization data for worst case temperature variation for each process split.

* * * * *

UNITED STATES PATENT AND TRADEMARK OFFICE
CERTIFICATE OF CORRECTION

PATENT NO.      : 7,583,555 B2                                Page 1 of 1
APPLICATION NO. : 10/814935
DATED           : September 1, 2009
INVENTOR(S)     : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Fourteenth Day of September, 2010

David J. Kappos
*Director of the United States Patent and Trademark Office*